(12) United States Patent
Yoshitake et al.

(10) Patent No.: US 8,868,297 B2
(45) Date of Patent: Oct. 21, 2014

(54) POWER STEERING SYSTEM AND CONTROL APPARATUS FOR POWER STEERING SYSTEM

(71) Applicant: Hitachi Automotive Systems Steering, Ltd., Saitama (JP)

(72) Inventors: Atsushi Yoshitake, Ebina (JP); Kohtaro Shiino, Isehara (JP); Hiroshi Sato, Yokohama (JP)

(73) Assignee: Hitachi Automotive Systems Steering, Ltd., Saitama (JP)

( * ) Notice: Subject to any disclaimer, the term of this patent is extended or adjusted under 35 U.S.C. 154(b) by 0 days.

(21) Appl. No.: 13/854,360

(22) Filed: Apr. 1, 2013

(65) Prior Publication Data

US 2013/0289827 A1 Oct. 31, 2013

(30) Foreign Application Priority Data

Apr. 26, 2012 (JP) ................................. 2012-100514

(51) Int. Cl.
*B62D 5/04* (2006.01)
(52) U.S. Cl.
CPC ............ *B62D 5/0493* (2013.01); *B62D 5/0463* (2013.01)
USPC ............................................ 701/42; 180/412
(58) Field of Classification Search
USPC ........................................... 701/42; 180/412
See application file for complete search history.

(56) References Cited

U.S. PATENT DOCUMENTS

| 5,504,679 A | 4/1996 | Wada et al. |
| 2005/0178608 A1* | 8/2005 | Shiino et al. ................... 180/444 |

FOREIGN PATENT DOCUMENTS

JP 6-239261 A 8/1994

OTHER PUBLICATIONS

Corresponding U.S. Appl. No. 13/854,352, filed Apr. 1, 2013.

* cited by examiner

*Primary Examiner* — Mary Cheung
*Assistant Examiner* — Yuen Wong
(74) *Attorney, Agent, or Firm* — Crowell & Moring LLP

(57) ABSTRACT

In a power steering system and a control apparatus for the power steering system, an abnormality detection process section (27) installed in a second ECU, the second ECU, the second ECU having a multi-core microcomputer in which a plurality of processor cores are mounted within a single processor package, to detect an abnormality of a first angle calculation process section of a first ECU, the first ECU having a single core microcomputer in which a single processor core is mounted within another single processor package and the first angle calculation process section a first angle calculation process section (21) installed in the first ECU to calculate rotation angles of the input axle and output axle on a basis of sinusoidal wave signals and cosine wave signals derived from a steering angle sensor and a torque sensor.

19 Claims, 5 Drawing Sheets

POWER STEERING SYSTEM AND CONTROL APPARATUS FOR POWER STEERING SYSTEM

BACKGROUND OF THE INVENTION (1) Field of the Invention

The present invention relates to a power steering system and a control apparatus for the power steering system. The power steering system provides a steering assistance force for a steering mechanism with an electrically driven motor as a drive source.

(2) Description of Related Art

As is well known, a power steering system detects a steering angle of a steering wheel from a neutral state of the steering wheel and transmits a torque to a steering mechanism of the vehicle from an electrically driven motor on a basis of the detected steering angle to perform an assistance of the steering.

In the power steering system, the steering angle signals calculated in a main calculation section and in a sub calculation section are compared with each other to determine the abnormality on the calculation of the steering angle.

A Japanese Patent Application First Publication No. Heisei 6-239261 published on Aug. 30, 1994 (which corresponds to a U.S. Pat. No. 5,504,679 issued on Apr. 2, 1996) exemplifies a previously proposed steering system in which the steering angle signals of single core CPUs which are mutually physically separated from each other are compared with each other to determine the abnormality. It should be noted that CPU is an abbreviation for Central Processing Unit.

SUMMARY OF THE INVENTION

However, there is a room in an improvement of an accuracy of the abnormality detection in the steering angle calculation. That is to say, the abnormality cannot be detected even if there is an abnormality in the calculation of the steering angle, the above-described abnormality detection methods are not highly reliable and the steering assistance force is often provided on a basis of a low reliable steering angle.

It is, therefore, an object of the present invention to provide a power steering system and control apparatus for the power steering system which are capable of improving an accuracy of the abnormality detection of the steering angle calculation and improving the reliability of the calculated steering angle.

According to the present invention, the power steering system includes a first ECU having a single core microcomputer in which a single processor core is mounted in a single processor package, a second ECU having a multi-core microcomputer in which a plurality of processor cores are mounted in the single processor package. The first ECU has a first angle calculation process section that calculates rotation angles of output axle and input axle on a basis of sinusoidal wave signals and cosine wave signals and the second ECU has the abnormality detection process section to detects the abnormality of the first angle calculation process section of the first ECU.

That is to say, according to one aspect of the present invention, there is provided a power steering system, comprising: a steering mechanism constituted by a steering shaft, the steering shaft including an input axle connected to a steering wheel and an output axle connected to the input axle via a torsion bar, and a conversion mechanism that converts a rotation of the steering shaft to a steering operation of steerable wheels; a steering angle sensor constituted by MR elements and arranged to output sinusoidal wave signals and cosine wave signals which are rotation angle information of the steering shaft; a torque sensor constituted by resolvers and arranged to output other sinusoidal wave signals and cosine wave signals which are at least rotation angle information of the output axle to detect a torque generated on the steering shaft using a relative angle between the input axle and output axle; an electrically driven motor that provides a steering assistance force for the steering mechanism; a first ECU having a single core microcomputer in which a single processor core is mounted within a single processor package; a steering angle signal receipt section installed in the first ECU to receive output signals from the steering angle sensor; a torque signal receipt section installed in the first ECU to receive other output signals from the torque sensor; a first angle calculation process section installed in the first ECU to calculate rotation angles of the input axle and output axle on a basis of the sinusoidal wave signals and cosine wave signals received from the steering angle signal receipt section and torque signal receipt section; a second ECU having a multi-core microcomputer in which a plurality of processor cores are mounted within another single processor package; first information communication circuit and second information communication circuit interposed between the first ECU and the second ECU, the first information communication circuit transmitting an information within the first ECU to the second ECU and the second information communication circuit transmitting an information within the second ECU to the first ECU; a motor control section installed in the second ECU to drivingly control the electrically driven motor on a basis of the rotation angles of the input axle and output axle which are calculation results of the first ECU transmitted via the first information communication circuit; and an abnormality detection process section installed in the second ECU to detect an abnormality of the first angle calculation process section of the first ECU.

According to another aspect of the present invention, there is provided a power steering system, comprising: a steering mechanism constituted by a steering shaft, the steering shaft including an input axle connected to a steering wheel and an output axle connected to the input axle via a torsion bar, and a conversion mechanism that converts a rotation of the steering shaft to a steering operation of steerable wheels; a steering angle sensor constituted by MR elements and arranged to output sinusoidal wave signals and cosine wave signals which are rotation angle information of the steering shaft; a torque sensor constituted by resolvers and arranged to output other sinusoidal wave signal and cosine wave signal which are at least rotation angle information of the output axle to detect a torque generated on the steering shaft using a relative angle between the input axle and the output axle; an electrically driven motor that provides a steering assistance force for the steering mechanism; a first ECU having a single core microcomputer in which a single processor core is mounted within a single processor package; a steering angle signal receipt section installed in the first ECU to receive an output signal from the steering angle sensor; a torque signal receipt section installed in the first ECU to receive another output signal from the torque sensor; a first angle calculation process section installed in the first ECU to calculate rotation angles of the input axle and output axle on a basis of sinusoidal wave signals and cosine wave signals received from the steering angle signal receipt section and torque signal receipt section; a second ECU having a multi-core microcomputer in which a plurality of processor cores are mounted within another single processor package; first information communication circuit and second information communication circuit interposed between the first ECU and the second ECU, the first information communication circuit transmitting an information within the first ECU to the second ECU and the second information communication circuit transmitting an information within the second ECU to the first ECU; a motor control section installed in the second ECU to drivingly control the electrically driven motor on a basis of the rotation angles of the input axle and output axle which are calculation results of the first ECU transmitted via the first information communication circuit; and an abnormality detection process section installed in the second ECU to detect an abnormality of the first angle calculation process section of the first ECU, the abnormality detection process section detecting the abnormality of the first angle calculation process section by comparing the rotation angle calculated by the first angle calculation process section on a basis of abnormality detecting purpose sinusoidal wave signal and cosine wave signal which are different from the output signals of the steering angle sensor and the torque sensor with the rotation angle calculated by the second ECU on a basis of the abnormality detecting purpose sinusoidal wave signal and cosine wave signal.

According to a still another aspect of the present invention, there is provided a control apparatus for a power steering system, the power steering system providing a steering assistance force for steerable wheels by an electrically driven motor along with a steering operation of a steering wheel, the control apparatus comprising: a first ECU having a single core microcomputer in which a single processor core is mounted within a single processor package; a steering angle signal receipt section installed in the first ECU to receive an output signal from a steering angle sensor, the steering angle sensor being constituted by MR elements and arranged to output sinusoidal wave signals and cosine wave signals which are rotation angle information of the steering shaft; a torque signal receipt section installed in the first ECU to receive an output signal from a torque sensor, the torque sensor being constituted by resolvers and arranged to output other sinusoidal wave signals and cosine wave signals which are at least rotation angle information of the output axle to detect a torque generated on the steering shaft using a relative angle between the input axle and the output axle; a first angle calculation process section installed in the first ECU to calculate rotation angles of the input axle and output axle on a basis of sinusoidal wave signals and cosine wave signals received from the steering angle signal receipt section and torque signal receipt section; a second ECU having a multi-core microcomputer in which a plurality of processor cores are mounted within another single processor package; first information communication circuit and second information communication circuit interposed between the first ECU and the second ECU, the first information communication circuit transmitting an information within the first ECU to the second ECU and the second information communication circuit transmitting an information within the second ECU to the first ECU; a motor control circuit installed within the second ECU to drivingly control the electrically driven motor on a basis of rotation angles of the input axle and output axle which are calculation results of the first ECU transmitted via the first information communication circuit; and an abnormality detection process section installed in the second ECU to detect an abnormality of the first angle calculation process section of the first ECU, the abnormality detection process section detecting the abnormality of the first angle calculation process section by comparing the rotation angle calculated by the first angle calculation process section on a basis of abnormality detecting purpose sinusoidal wave signal and cosine wave signal which are different from the output signals of the steering angle sensor and the torque sensor with the rotation angle corresponding to the abnormality detection purpose sinusoidal wave signal and cosine wave signal calculated by the second ECU.

DETAILED DESCRIPTION OF THE INVENTION

Each of first, second, and third preferred embodiments of a power steering system according to the present invention will be described below with reference to the attached drawings.

[First Embodiment]

Figure 1:
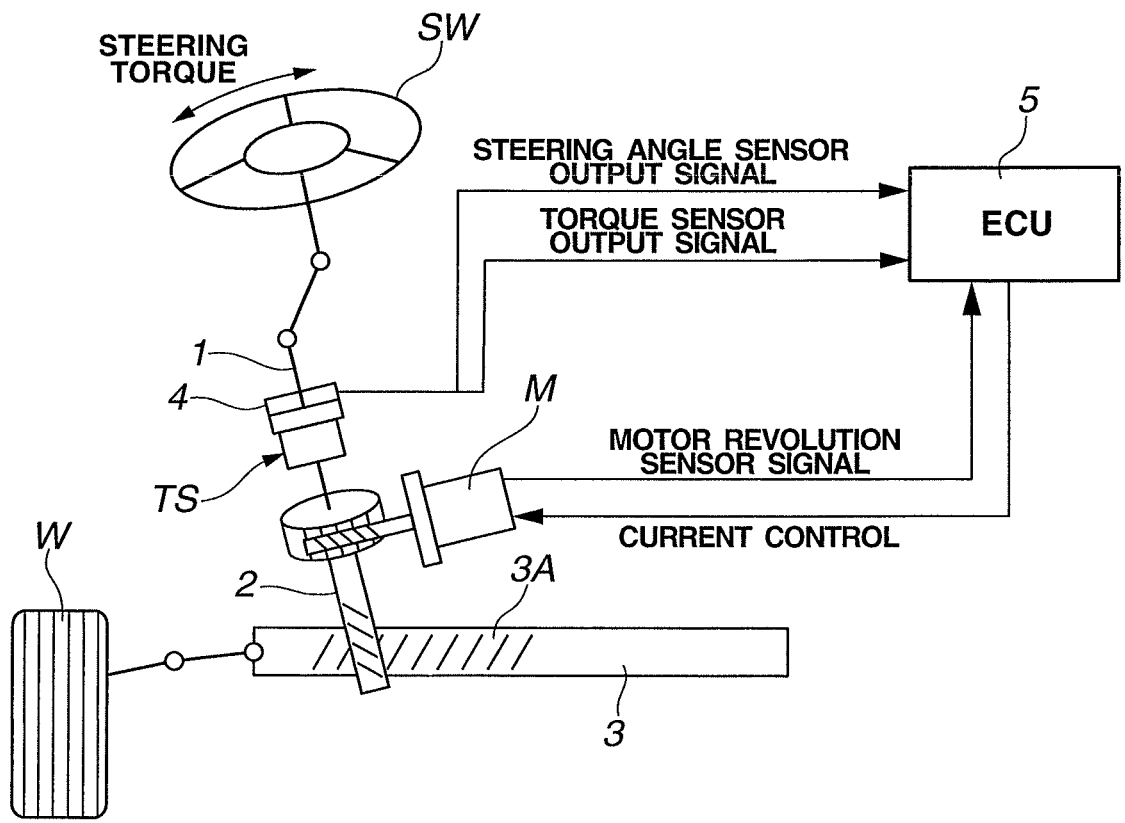
FIG. 1 is a rough configuration view of a power steering system in a preferred embodiment according to the present invention.

FIG. 1 shows a rough configuration view of a power steering system in the first embodiment according to the present invention.

In FIG. 1, the power steering system includes: a basic steering mechanism having a steering wheel SW, a steering shaft 1, a pinion axle 2, a rack axle 3. When steering wheel SW is rotationally operated with a vehicle driver, a steering torque of steering wheel SW is transmitted to pinion axle 2 via steering shaft 1. The rotational motion of pinion axle 2 is converted into a linear motion of rack axle 3 so that left and right steerable wheels W linked to both ends of rack axle 3 are steered. In other words, rack teeth 3A are formed on rack axle 3 meshed with pinion axle 2. The mesh of rack teeth 3A with pinion axle 2 constitute a conversion mechanism to convert the rotation of steering shaft 1 to the steer operation.

In addition, a torque sensor TS and a steering angle sensor 4 are disposed on steering shaft 1 to detect a torque of steering shaft 1 and to detect a rotation angle of steering shaft 1 and a current control of electrically driven motor M is performed by a control unit 5 (hereinafter, referred as to an ECU) on a basis of output signals of torque sensor TS and steering angle sensor 4 and a motor rotational (revolution) sensor signal. Thus, a steering assistance force from electrically driven motor M to pinion axle 2 is provided. It should be noted that ECU is an abbreviation for Electronic Control Unit and MPU is an abbreviation for MicroProcessor Unit.

Figure 2:
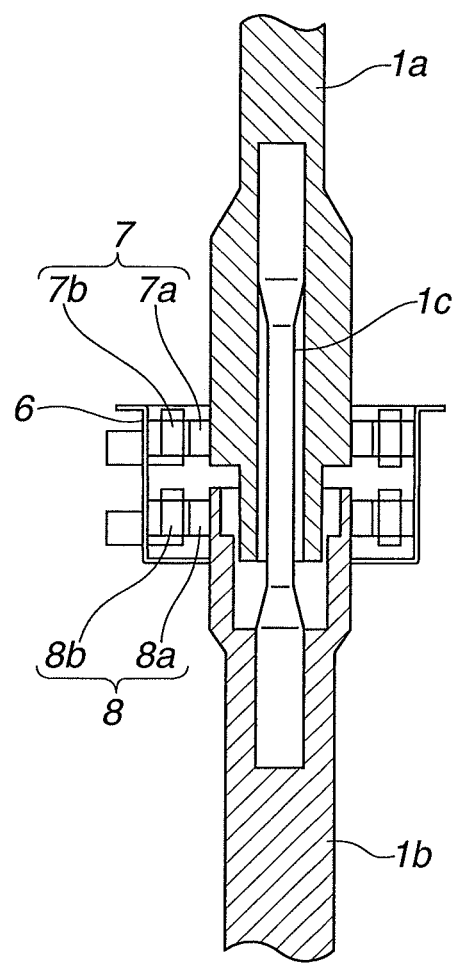
FIG. 2 is a cross sectional view of a torque sensor shown in FIG. 1.

As shown in FIG. 2, steering shaft 1 is axially divided into an input axle 1a of steering wheel side SW and an output axle 1b of rack axle side 3. Both of input axle 1a and output axle 1b are formed in hollow shapes and mutually coaxially linked to each other via a torsion bar 1c installed within an inner periphery of input axle 1a and output axle 1b. It should be noted that, input axle 1a, torsion bar 1c, output axle 1b, and torsion bar 1c are linked to each other by means of an neutral pin, a press fit, or so forth. Thus, input axle 1a and output axle 1b can relatively be rotated with a twisted deformation of torsion bar 1c.

A casing 6 is disposed on an outer peripheral side of steering shaft 1 and is fixed to a vehicle body while surrounding of the outer periphery of steering shaft 1 so as to enable a correspondence to an external use environment and an input side rotation angle sensor (for example, a resolver) 7 is disposed between an inner peripheral surface of casing 6 and an outer peripheral surface of input axle $1a$ to detect a rotational displacement of input axle $1a$. An output axle side rotation angle sensor (for example, another resolver) 8 is disposed between the inner peripheral surface of casing 6 and the outer peripheral surface of output axle $1b$ to detect a rotational displacement of output axle $1b$.

That is to say, a relative rotation displacement between input axle $1a$ and output axle $1b$ based on the torsional (twisted) deformation of torsion bar $1c$ is detected by both rotation angle sensors 7, 8 so that a steering torque rotationally operated by a vehicle driver through steering wheel SW is detected. In other words, a toque sensor TS to detect a torque acted upon steering shaft 1 is constituted by both rotation angle sensors 7, 8.

Each of rotation angle sensors 7, 8 are constituted by a well known variable reluctance (VR) type in which a coil is wound on a stator but no coil is wound on a rotor. Input axle side rotation angle sensor 7 includes an annular input axle side rotor $7a$ integrally fitted into the outer peripheral surface of input axle $1a$ and an annular input side stator $7b$ fixed to casing 6 and extrapolated on the outer peripheral surface of input side rotor $7a$ via a gap in a predetermined radial direction. On the other hand, output axle side rotation angle sensor 8 includes an annular output axle side rotor $8a$ integrally fitted into the outer peripheral surface of output axle $1b$ and an annular output axle side stator $8b$ fixed to casing 6 and extrapolated on the outer peripheral side of output side rotor $8a$ via a predetermined radial direction gap.

Sinusoidal wave signals $\sin θ1$, $\sin θ2$ and cosine wave signal $\cos θ1$, $\cos θ2$ from input axle side rotation angle sensor 7 and output axle side rotation angle sensor 8 are supplied to ECU 5 through a harness (a clock table, a slip ring, or so forth), a wireless communication, or so forth.

Figure 3A:
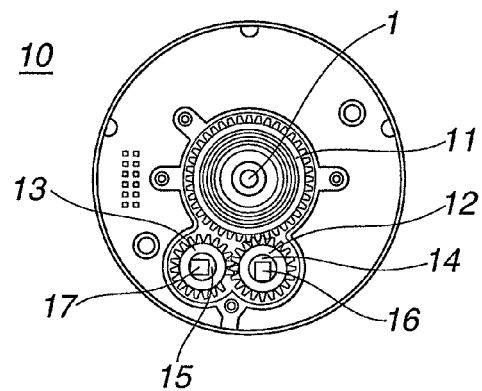
FIGS. 3A and 3B are configuration views of a steering angle sensor shown in FIG. 1.
Figure 3B:
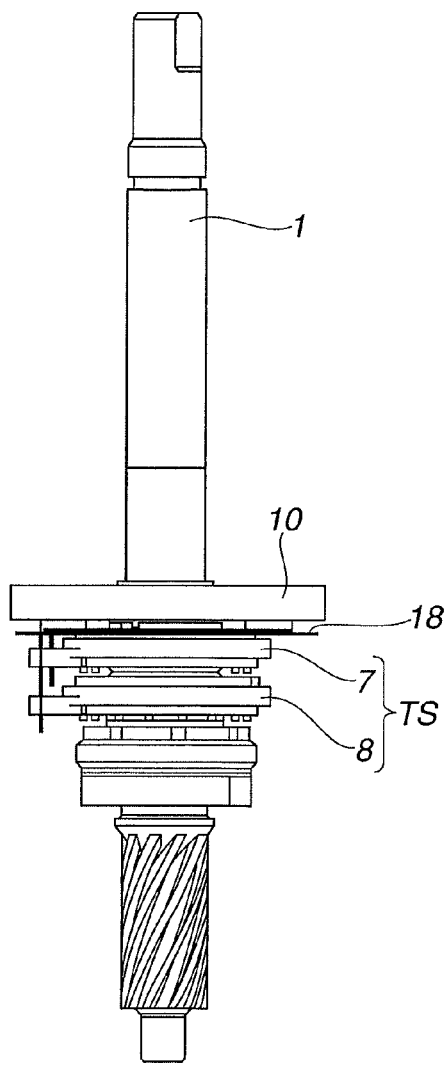

Steering angle sensor 4 includes, as shown in FIGS. 3(A) and 3(B), a first gear 11 rotated in accordance with a rotation of steering shaft 1 as a rotary body; a second gear 12 meshed with first gear 11; and a third gear 13 meshed with second gear 12. A circuit substrate (printed circuit board) 18 is so arranged as to cover first, second, and third gears 11 through 13.

A plurality of teeth (sections) are formed on the outer peripheral side of respective gears 11 through 13. A number of teeth of second and third gears 12, 13 for detection purpose gears are set to have a predetermined speed reduction ratio except 1. Magnetic members 14, 15 on which N pole and S pole are magnetized are attached onto second and third gears 12, 13 and MR (magnetic reluctance) elements 16, 17 are installed on a circuit substrate 18 to oppose against respectively corresponding magnetic members 14, 15. Each MR element 16, 17 detects a variation of the magnetic field generated by the correspondingly opposed one of magnetic members 14, 15 as a change in a resistance value of a resistance element. Thus, each MR element 16, 17 detects a third rotation angle and a fourth rotation angle which are rotation angles of the respective second and third gears 12, 13. As described above, the steering angle of steering wheel SW is detected on a basis of third and fourth rotation angles detected in this way.

Next, ECU (electronic control unit) 5 in the first embodiment will be described below.

Figure 4:
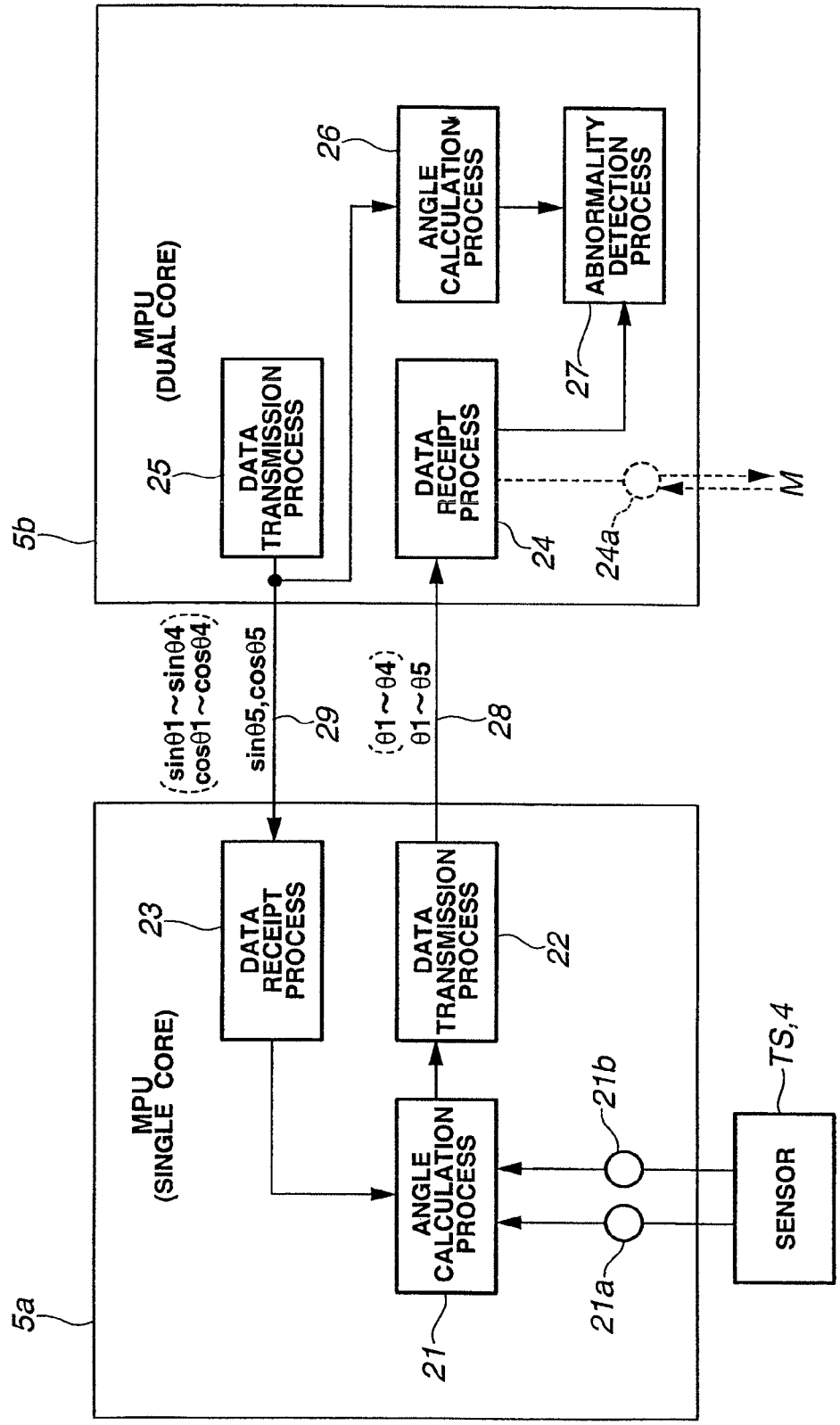
FIG. 4 is a block diagram of an ECU shown in FIG. 1.

As shown in FIG. 4, ECU 5 in this embodiment mainly includes a first ECU $5a$ having a single core microcomputer in which a single processor core is mounted within a single processor package and a second ECU $5b$ having a dual microcomputer in which two processor cores are mounted within the single processor package.

As shown in FIG. 4, first ECU $5a$ includes: a first angle calculation process section 21; a data transmission process section 22; and data receipt process section 23. On the other hand, second ECU $5b$ includes a data receipt process section 24; a second angle calculation process section 26; and an abnormality detection section 27. It should be noted that first ECU $5a$ functions as a sensor ECU which converts sinusoidal wave signal signals $\sin θ1$, $\sin θ2$ and cosine wave signals $\cos θ1$, $\cos θ2$ which are the rotation angle information of steering wheel SW outputted from torque sensor TS (input axle side rotational angel sensor and output axle side rotation angle sensors 7, 8) and sinusoidal wave signals $\sin θ3$, $\sin θ4$ and cosine wave signals $\cos θ3$, $\cos θ4$ which are rotation angle information of steering wheel SW outputted from steering angle sensor 4 (MR elements 16, 17) into rotation angles $θ1$, $θ2$, $θ3$, and $θ4$ and second ECU $5b$ functions as a motor ECU which controls a motor current on a basis of rotation angles of $θ1$, $θ2$, $θ3$, and $θ4$.

A first information communication circuit 28 and a second information communication circuit 29 are interposed between first ECU $5a$ and second ECU $5b$. First information communication circuit 28 transmits the information within first ECU $5a$ to second ECU $5b$. Second information communication circuit 29 transmits the information within second ECU $5b$ to first ECU $5a$. It should be noted that, although, in FIG. 4, first and second information communication circuits are described in two lines for explanation conveniences, a single information communication circuit which is bi-directionally communicable can be applied.

In first ECU $5a$, first, sinusoidal wave signals $\sin θ1$, $\sin θ2$ and cosine wave signals $\cos θ1$, $\cos θ2$ are received by a torque signal receipt section $21b$. Sinusoidal wave signals $\sin θ3$, $\sin θ4$ and cosine wave signals $\cos θ3$, $\cos θ4$ outputted from steering angle sensor 4 are received by a steering angle receipt section $21a$. Then, first angle calculation process section 21 calculates rotation angle $θ1$ of input axle $1a$ and output axle $1b$ using the following equation:

$$\tan^{-1}=(\sin θ1/\cos θ1)=θ1$$

It should be noted that $θ2$, $θ3$, and $θ4$ can be calculated in the same way.

Data transmission process section 22 transmits rotation angles of $θ1$, $θ2$, $θ3$, $θ4$ of input axle $1a$ and output axle $1b$ to second ECU $5b$ via first information communication circuit 28.

In second ECU $5b$, the signals of rotation angles $θ1$, $θ2$, $θ3$, $θ4$ of input axle $1a$ and output axle $1b$ transmitted from first ECU $5a$ are received by data receipt process section 24 and motor control section $24a$ of second ECU $5b$ drivingly controls motor M.

Motor control section $24a$ calculates the torsional angle (twisted angle) of torsion bar $1c$ from a difference between rotation angle $θ1$ of input axle $1a$ and output axle $1b$ and detects the steering torque generated on torsion bar $1c$ from the torsion bar twisted angle using the following equation:

$$(\text{steering torque})=(\text{torsional(twisted)angle of torsion bar})\times(\text{torsion bar stiffness(or rigidity)})$$

Motor control section $24a$ inputs a motor rotation (revolution) sensor signal, a vehicle speed signal, a steering speed signal, and so forth and calculates a command current value to electrically driven motor M on a basis of the steering torque, the motor rotation (revolution) sensor signal, the vehicle speed signal, steering speed signal, and so forth.

In addition, another sinusoidal wave signal $\sin θ5$ and cosine wave signal $\cos θ5$ for an abnormality detection purpose are stored in a memory of second ECU $5b$ which are different from output signals $\sin θ1$ through $\sin θ4$ and $\cos θ1$ through $\cos θ4$ which are output signals of torque sensor TS and steering angle sensor 4.

This sinusoidal wave signal and cosine wave signal sin θ5 and cos θ5 are outputted to first ECU 5a from data transmission process section 25 to first ECU 5a via second information communication circuit 29 as pseudo signals. First ECU 5a receives this sinusoidal wave signal sin θ5 and cosine wave signal cos θ5 at data receipt process section 23. This abnormality detection purpose sinusoidal wave signal sin θ5 and cosine wave signal cos θ5 are converted to rotation angle θ5 at first angle calculation process section 21 and rotation angle of θ5 is transmitted from first ECU 5a to second ECU 5b as an answer signal via data transmission process section 22, first information communication circuit 28, and data receipt process section 24. Then, this answer signal is transmitted from data receipt process section 24 to abnormality detection process section 27.

Abnormality detection purpose sinusoidal wave signal sin θ5 and cosine wave signal cos θ5 stored in the memory of second ECU 5b are outputted from data transmission process section 25 to second angle calculation process section 26 and rotation angle θ5 on a basis of this abnormality detection purpose sinusoidal wave signal sin θ5 and cosine wave signal cos θ5 is calculated at second angle calculation process section 26. Second ECU 5b is a dual core microcomputer in which two processors are mounted as described before, the same angle calculations are carried out in the respective processor cores, and results of the calculations are mutually compared with each other.

Abnormality detection process section 27 compares rotation angle θ5 calculated by first angle calculation process section 21 and rotation angle θ5 calculated by second angle calculation process section 26 to detect the presence or absence of the abnormality of first angle calculation process section 21.

As described hereinabove, according to the power steering system in the first embodiment, second ECU 5b carries out the abnormality detection of first angle calculation section 21, in second ECU 5b, a highly (arithmetic operation) calculation reliable multi-core microcomputer being mounted. Thus, reliability of first angle calculation process section 21 can be improved.

That is to say, second ECU 5b includes the dual core microcomputer (MPU, micro processing unit) and, at second angle calculation process section 26 carries out the same angle calculations at the respective processor cores. Consequently, since the abnormality can be detected even if there is an error in the calculation process in the one processor core, the rotation angle calculated by second angle calculation process section 26 becomes highly reliable. On the assumption that rotation angle θ5 calculated by second angle calculation process section 26 is correct, an accuracy of the abnormality detection is improved by comparing rotation angle θ5 calculated by first angle calculation process section 21 with rotation angle θ5 calculated by second angle calculation process section 26 and the reliability of rotation angle θ5 calculated at first angle calculation process section 21 is accordingly improved.

In addition, abnormality detection process section 27 does not use any one of sinusoidal wave signals sine θ1 through sin θ4 and cosine wave signals cos θ1 through cos θ4 outputted from steering angle sensor 4 and torque sensor TS. Hence, it is possible to suppress an increase in a communication data quantity in first information communication circuit 28.

That is to say, first information communication circuit 28 needs to transmit both rotation angles θ1 through θ4 used for the calculation in the motor control section and the communication date quantity is accordingly increased. In a case where sinusoidal wave signals sin θ1 through sin θ4 and cosine wave signals cos θ1 through cos θ4 outputted from steering angle sensor 4 and torque sensor TS are used for the abnormality detection, sinusoidal wave signals sin θ1 through sin θ4 and cosine wave signals cos θ1 through cos θ4 are needed to be transmitted to second ECU 5b via first information communication circuit 28. The communication date quantity is accordingly further increased. Furthermore, in a case where a communication capacity of first information communication circuit 28 is small, a calculation period is needed to be delayed.

Whereas, in the first embodiment, as the signal for the abnormality detection, sinusoidal wave signal sin θ5 and cosine wave signal cos θ5 are used as the pseudo signals for the abnormality detection. The data transmitted from first ECU 5a to second ECU 5b is only rotational angel θ5 in addition to rotation angles of θ1 through θ4. Hence, the increase in the data quantity in first information communication circuit 28 can be suppressed. In addition, it becomes unnecessary to delay the calculation period.

In addition, in a case where the abnormality detection of the processes in first ECU 5a, it is necessary to transmit the data from first ECU 5a to second ECU 5b. At this time, since first information communication circuit 28 is naturally large in communication date quantity and a space therein is limited. Thus, the abnormality detection of all of the processes carried out in first ECU 5a cannot be carried out and the abnormality detection for one of the processes having a high degree of importance is carried out in the case of the previously proposed steering system. However, in the first embodiment, since the data communication quantity of first information communication circuit 28 as described before is suppressed and many data can be transmitted from first ECU 5a, it becomes possible to perform the abnormality detection of a great number of processes in first ECU 5a and, thus, a comprehensiveness of the abnormality detection is improved.

Furthermore, abnormality detection purpose sinusoidal wave signal sin θ5 and cosine wave signal cos θ5 are stored in second ECU 5b. Thus, rotation angle θ5 corresponding to abnormality detection purpose sinusoidal wave signal sin θ5 and cosine wave signal cos θ5 are stored within second ECU 5b can be calculated. Thus, the same calculation as that using the same signal as first ECU 5a is carried out so that the abnormality detection accuracy can be improved.

[Second Embodiment]

Next, the power steering system in a second preferred embodiment according to the present invention will be described below.

In the first embodiment, abnormality detection purpose sinusoidal wave signal sin θ5 and cosine wave signal cos θ5 are transmitted to first ECU 5b from first ECU 5a. In the second embodiment, first ECU 5a stores a plurality of abnormality detection purpose sinusoidal wave signals sin θ5 and cosine wave signals cos θ5.

In details, second ECU 5b transmits a calculation command signal having a question number from second ECU 5b to first ECU 5a via second information communication circuit 29. First ECU 5a stores the plurality of abnormality detection purpose sinusoidal wave signals sin θ5 and cosine wave signals cos θ5 corresponding to the question numbers in the memory. First ECU 5a reads abnormality detection purpose sinusoidal wave signal sin θ5 and cosine wave signal cos θ5 corresponding to one of the question numbers from second ECU 5b and first angle calculation process section 21 calculates rotation angle θ5. This rotation angle θ5 is transmitted to abnormality detection process section 27 of second ECU 5b via data transmission process section 22, first information communication circuit 28, and data receipt process section 24.

In addition, second ECU 5b transmits abnormality detection purpose sinusoidal wave signal sin θ5 and cosine wave signal cos θ5 corresponding to the question number from data transmission process section 25 to second angle calculation process section 26. Abnormality detection process section 27 receives calculated rotation angle θ5 from second angle calculation process section 26. Abnormality detection process section 27 compares rotation angles θ5, θ5 calculated by first and second angle calculation process sections 21, 26 with each other to detect the presence or absence of the abnormality.

As described above, in the power steering system in the second embodiment, in addition to the action and effect of the first embodiment, it is not necessary to transmit abnormality detection purpose sinusoidal wave signal and cosine wave signal sin θ5 and cos θ5 from second ECU 5b to first ECU 5a so that a transmission load of second information communication circuit 29 can be suppressed.

In addition, second ECU 5b outputs the calculation command signal so that second ECU 5b can control a timing at which first ECU 5a carries out the abnormality detection purpose calculation.

[Third Embodiment]

Next, a third preferred embodiment of the power steering system according to the present invention will be described below. In each of the first and second embodiments, rotation angles of θ5 calculated on a basis of abnormality detection purpose sinusoidal wave signal and cosine wave signal. In the third embodiment, rotation angles of θ1 through θ4 calculated on a basis of sinusoidal wave signals sin θ1 through sin θ4 and cosine wave signals cos θ1 through cos θ4 outputted from torque sensor TS and steering angle sensor 4 are compared.

Specifically, rotation angles θ1 through θ4 are calculated on a basis of sinusoidal wave signals sin θ1 through sin θ4 and cosine wave signals cos θ1 through cos θ4 outputted from torque sensor TS and steering angle sensor 4 and rotation angles θ1 through θ4 are transmitted to abnormality detection section 27 via data transmission process section 22, first information communication circuit 28, and data receipt process section 24.

In addition, sinusoidal wave signals sin θ1 through sin θ4 and cosine wave signals cos θ1 through cos θ4 outputted from torque sensor TS and steering angle sensor 4 are inputted to second angle calculation process section 26 of second ECU 5b via data transmission process section 22, first information communication circuit 28, and data receipt process section 24. Second angle calculation process section 26 calculates rotation angles θ1 through θ4 on a basis of sinusoidal wave signals sin θ1 through sin θ4 and cosine wave signals cos θ1 through cos θ4.

Abnormality detection section 27 compares rotation angles of θ1 through θ4 calculated by first angle calculation process section 21 and calculated by second angle calculation process section 26 to perform the abnormality detection.

It should be noted that, in the third embodiment, abnormality detection purpose sinusoidal wave signal sin θ1 and cosine wave signal cos θ5 which are pseudo signals used in first and second embodiments are not used.

As described above, in the power steering system in the third embodiment, in addition to the action and effect described in each of the first and second embodiments, second angle calculation process section 26 carries out the calculation of rotation angles θt through 4 on a basis of sinusoidal wave signals sin θ1 through sin θ4 and cosine wave signals cos θ1 through cos θ4 outputted from torque sensor TS and steering angle sensor 4 and abnormality detection section 27 compares these rotation angles so that the abnormality detection accuracy can be improved.

As described hereinabove, the detailed description has been made with respect to only the described specific examples. However, various changes and modifications may be made in a range of a technical concept of the present invention without departing from the scope of the present invention.

For example, the signals related to the rotation angle outputted from first ECU 5a to second ECU 5b via first information communication circuit 28 may be divided and transmitted In this way, the data quantity per time in first information communication circuit 28 is suppressed. Hence, it becomes possible to transmit the other signals with a higher priority.

Figure 5:
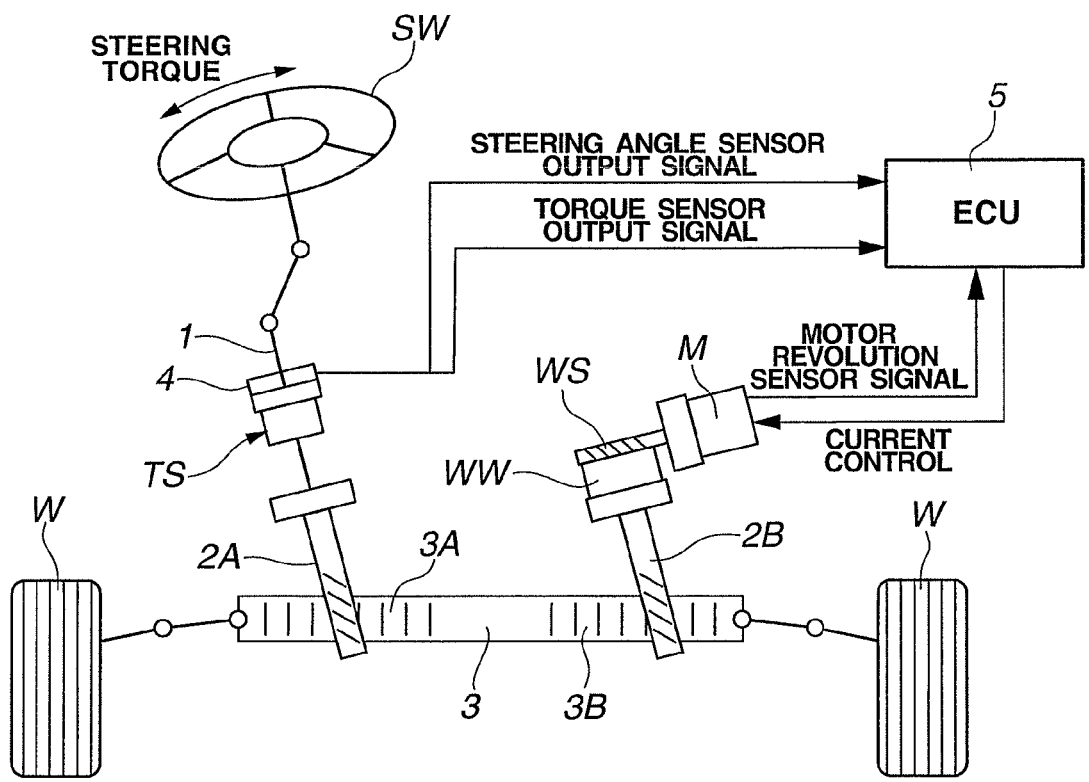
FIG. 5 is a rough configuration view of the power steering system of a dual pinion steering mechanism to which the present invention is applicable.

In addition, in the first embodiment, the steering mechanism of a pinion assist type which provides a steering assistance force for pinion axle 2 from electrically driven motor M has been described. The present invention is applicable to another steering mechanism of a dual pinion type, as shown in FIG. 5, constituted by a first pinion axle 2A disposed on output axle 1b, a rack bar 3 on which first rack teeth section 3A meshed with the first pinion axle and second rack teeth section 3B different from first rack teeth are formed, a second pinion axle 2B meshed with second rack teeth section 3B, and a worm wheel WW disposed on the second pinion axle, and a worm shaft WS meshed with the worm wheel and to which a rotational force (torque) of electrically driven motor M is given.

In this way, since the first pinion that is revolved by means of the steering wheel and the second pinion that is rotationally driven by means of the electrically driven motor are respectively disposed, a load applied on the first and second pinions can be shared and the power steering system having a larger output can be provided.

In addition, first ECU 5a may be installed at the steering axle side and second ECU 5b may be installed at the electrically driven motor side M. In this way, first and second ECU 5a, 5b nay separately be disposed. Since first ECU 5a and second ECU 5b may be disposed according to the respective functions so that the reliability of the signal transmission and the reduction of a transmission loss can be achieved.

In addition, in the second embodiment, the calculation command signal from second ECU 5b to first ECU 5a is outputted. However, the calculation command signal from second ECU 5b to first ECU 5a may not be transmitted, the calculation period and question numbers may be preset in first ECU 5a, and the calculation of the pseudo signals in accordance with the settings may be carried out.

In addition, in the first embodiment, the dual core microcomputer in which two processor cores are mounted within the single processor package has been described. However, the multi-core microcomputer in which four or eight processor cores are mounted within the single processor core may be used.

Technical ideas grasped from the respective embodiments described above will be described below together with the effects.

(1) The power steering system as claimed in claim 4, wherein the second ECU outputs a calculation command signal to the first ECU to calculate the rotation angle on a basis of the abnormality detection purpose sinusoidal wave signal and cosine wave signal.

(1) According to the technical idea described in item (1), the output of the calculation command signal from the second ECU permits the second ECU to control a timing at which the abnormality detection purpose calculation by the first ECU is carried out.

(2) The power steering system as claimed in claim 1, wherein the abnormality detection process section detects the abnormality of the first angle calculation process section by comparing rotation angles calculated by the first angle calculation section on a basis of the output signals from the steering angle sensor or the torque sensor with the rotation angles calculated in the second ECU on a basis of the output signals from the steering angle sensor or the torque sensor.

(2) According to the technical idea described in item (2), the second ECU performs the same calculations on a basis of the same signals use for the motor control to detect the abnormality of the first angle calculation section. Thus, the detection accuracy of the abnormality can be improved.

(3) The power steering system as claimed in claim 1, wherein signals on the rotation angles which are the calculation results of the first ECU are divided via the first information communication circuit and are transmitted to the second ECU.

(3) According to the technical idea described in item (3), the signals related to the rotation angles are divided and transmitted so that the other signals are transmitted with a higher priority.

(4) The power steering system as claimed in claim 5, wherein the steering mechanism includes a first pinion axle disposed on the output axle; a rack bar on which a first rack teeth section meshed with the first pinion axle and a second rack teeth section which is a rack axle different from the first rack teeth section are formed; a second pinion axle meshed with the second rack teeth section; a worm wheel disposed on the second pinion axle; and a worm shaft meshed with the worm wheel and on which a rotational force of the electrically driven motor is provided.

(4) According to the technical idea described in item (4), the first pinion axle rotated by means of the steering wheel and the second pinion axle rotationally driven by means of motor M are disposed respectively. Thus, the loads on the first and second pinions can be shared so that a large output system can be provided. It should be noted that the worm wheel and the worm shaft constitutes a speed reduction device.

(5) The power steering system as set forth in item (4), wherein the first ECU is disposed at the steering shaft side and the second ECU is disposed at the electrically drive motor side and which is separated from the first ECU.

(5) According to the technical idea described in item (5), the first ECU and the second ECU are separately arranged according to the respective functions of the first and second ECU so that a reliability of a signal transmission and a reduction of a transmission loss can be achieved.

(6) The power steering system as set forth in item (4), wherein the abnormality detection purpose sinusoidal wave signal and cosine wave signal are stored in the second ECU and are transmitted to the first ECU.

(6) According to the technical idea described in item (6), the abnormality detection purpose sinusoidal wave signal and cosine wave signal are provided in the second ECU. Hence, the second ECU can calculate the rotation angle corresponding to the abnormality detection purpose sinusoidal wave signal and cosine wave signal. Hence, the same calculation using the same signal of the first ECU is carried out to enable the abnormality detection accuracy.

(7) The power steering system as set forth in item (4), wherein the abnormality detection purpose sinusoidal wave signal and cosine wave signal are stored in the first ECU.

(7) According to the technical idea described in item (7), it is not necessary to transmit the abnormality detection purpose sinusoidal wave signal and cosine wave signal from the second ECU to the first ECU. Hence, a transmission load can be suppressed.

(8) The power steering system as set forth in item (7), wherein the second ECU outputs a calculation command signal to the first ECU to calculate the rotation angle on a basis of the abnormality detection purpose sinusoidal wave signal and cosine wave signal.

(8) According to the technical idea described in item (8), the output of the calculation command signal from the second ECU permits the second ECU to control a timing at which the abnormality detection purpose calculation by the first ECU is carried out.

(9) The power steering system as claimed in claim 5, wherein signals on the rotation angles which are the calculation results of the first ECU are divided via the first information communication circuit and are transmitted to the second ECU.

(9) According to the technical idea described in item (9), the signals related to the rotation angles are divided and transmitted so that the other signals are transmitted with a higher priority.

(10) The control apparatus for the power steering system as claimed in claim 6, wherein the abnormality detection purpose sinusoidal wave signal and cosine wave signal are stored in the second ECU and are transmitted to the first ECU.

(10) According to the technical idea described in item (10), the abnormality detection purpose sinusoidal wave signal and cosine wave signal are provided in the second ECU. Hence, the second ECU can calculate the rotation angle corresponding to the abnormality detection purpose sinusoidal wave signal and cosine wave signal. Hence, the same calculation using the same signal of the first ECU is carried out to enable the abnormality detection accuracy.

(11) The control apparatus for the power steering system as claimed in claim 6, wherein the abnormality detection purpose sinusoidal wave signal and cosine wave signal are stored in the first ECU.

(11) According to the technical idea described in item (11), it is not necessary to transmit the abnormality detection purpose sinusoidal wave signal and cosine wave signal from the second ECU to the first ECU. Hence, a transmission load can be suppressed.

(12) The control apparatus for the power steering system as set forth in item (11), wherein the second ECU outputs a calculation command signal to the first ECU to calculate the rotation angle on a basis of the abnormality detection purpose sinusoidal wave signal and cosine wave signal.

(12) According to the technical idea described in item (12), the output of the calculation command signal from the second ECU permits the second ECU to control a timing at which the abnormality detection purpose calculation by the first ECU is carried out.

(13) The control apparatus for the power steering system as claimed in claim 6, wherein signals on the rotation angles which are the calculation results of the first ECU are divided via the first information communication circuit and are transmitted to the second ECU.

(13) According to the technical idea described in item (13), the signals related to the rotation angles are divided and transmitted so that the other signals are transmitted with a higher priority.

This application is based on a prior Japanese Patent Application No. 2012-100514 filed in Japan on Apr. 26, 2012. The entire contents of this Japanese Patent Application No. 2012-

100514 are hereby incorporated by reference. Although the invention has been described above by reference to certain embodiments of the invention, the invention is not limited to the embodiment described above. Modifications and variations of the embodiments described above will occur to those skilled in the art in light of the above teachings. The scope of the invention is defined with reference to the following claims.

What is claimed is:

1. A power steering system, comprising:
a steering mechanism constituted by a steering shaft, the steering shaft including an input axle connected to a steering wheel and an output axle connected to the input axle via a torsion bar, and a conversion mechanism that converts a rotation of the steering shaft to a steering operation of steerable wheels;
a steering angle sensor constituted by magnetic reluctance elements and arranged to output sinusoidal wave signals and cosine wave signals which are rotation angle information of the steering shaft;
a torque sensor constituted by resolvers and arranged to output other sinusoidal wave signals and cosine wave signals which are at least rotation angle information of the output axle to detect a torque generated on the steering shaft using a relative angle between the input axle and output axle;
an electrically driven motor that provides a steering assistance force for the steering mechanism;
a first control unit having a single core microcomputer in which a single processor core is mounted within a single processor package;
a steering angle signal receipt section installed in the first control unit to receive output signals from the steering angle sensor;
a torque signal receipt section installed in the first control unit to receive other output signals from the torque sensor;
a first angle calculation process section installed in the first control unit to calculate rotation angles of the input axle and output axle on a basis of the sinusoidal wave signals and cosine wave signals received from the steering angle signal receipt section and torque signal receipt section;
a second control unit having a multi-core microcomputer in which a plurality of processor cores are mounted within another single processor package;
first information communication circuit and second information communication circuit interposed between the first control unit and the second control unit, the first information communication circuit transmitting an information within the first control unit to the second control unit and the second information communication circuit transmitting an information within the second control unit to the first control unit;
a motor control section installed in the second control unit to drivingly control the electrically driven motor on a basis of the rotation angles of the input axle and output axle which are calculation results of the first control unit transmitted via the first information communication circuit; and
an abnormality detection process section installed in the second control unit to detect an abnormality of the first angle calculation process section of the first control unit.

2. The power steering system as claimed in claim 1, wherein the abnormality detection process section detects the abnormality of the first angle calculation process section by comparing the rotation angle calculated by the first angle calculation process section on a basis of abnormality detecting purpose sinusoidal wave signal and cosine wave signal which are different from the output signals of the steering angle sensor and the torque sensor with the rotation angle calculated by the second control unit on a basis of the abnormality detecting purpose sinusoidal wave signal and cosine wave signal.

3. The power steering system as claimed in claim 2, wherein the abnormality detecting purpose sinusoidal wave signal and cosine wave signal are stored in the second control unit and transmitted to the first control unit.

4. The power steering system as claimed in claim 2, wherein the abnormality purpose sinusoidal wave signal and cosine wave signal are stored in the first control unit.

5. The power steering system as claimed in claim 4, wherein the second control unit outputs a calculation command signal to the first control unit to calculate the rotation angle on a basis of the abnormality detection purpose sinusoidal wave signal and cosine wave signal.

6. The power steering system as claimed in claim 1, wherein the abnormality detection process section detects the abnormality of the first angle calculation process section by comparing rotation angles calculated by the first angle calculation section on a basis of the output signals from the steering angle sensor or the torque sensor with the rotation angles calculated in the second control unit on a basis of the output signals from the steering angle sensor or the torque sensor.

7. The power steering system as claimed in claim 1, wherein signals on the rotation angles which are the calculation results of the first control unit are divided via the first information communication circuit and are transmitted to the second control unit.

8. A power steering system, comprising:
a steering mechanism constituted by a steering shaft, the steering shaft including an input axle connected to a steering wheel and an output axle connected to the input axle via a torsion bar, and a conversion mechanism that converts a rotation of the steering shaft to a steering operation of steerable wheels;
a steering angle sensor constituted by magnetic reluctance elements and arranged to output sinusoidal wave signals and cosine wave signals which are rotation angle information of the steering shaft;
a torque sensor constituted by resolvers and arranged to output other sinusoidal wave signal and cosine wave signal which are at least rotation angle information of the output axle to detect a torque generated on the steering shaft using a relative angle between the input axle and the output axle;
an electrically driven motor that provides a steering assistance force for the steering mechanism;
a first control unit having a single core microcomputer in which a single processor core is mounted within a single processor package;
a steering angle signal receipt section installed in the first control unit to receive an output signal from the steering angle sensor;
a torque signal receipt section installed in the first control unit to receive another output signal from the torque sensor;
a first angle calculation process section installed in the first control unit to calculate rotation angles of the input axle and output axle on a basis of sinusoidal wave signals and cosine wave signals received from the steering angle signal receipt section and torque signal receipt section;
a second control unit having a multi-core microcomputer in which a plurality of processor cores are mounted within another single processor package;

first information communication circuit and second information communication circuit interposed between the first control unit and the second control unit, the first information communication circuit transmitting an information within the first control unit to the second control unit and the second information communication circuit transmitting an information within the second control unit to the first control unit;

a motor control section installed in the second control unit to drivingly control the electrically driven motor on a basis of the rotation angles of the input axle and output axle which are calculation results of the first control unit transmitted via the first information communication circuit; and an abnormality detection process section installed in so the second control unit to detect an abnormality of the first angle calculation process section of the first control unit, the abnormality detection process section detecting the abnormality of the first angle calculation process section by comparing the rotation angle calculated by the first angle calculation process section on a basis of abnormality detecting purpose sinusoidal wave signal and cosine wave signal which are different from the output signals of the steering angle sensor and the torque sensor with the rotation angle calculated by the second control unit on a basis of the abnormality detecting purpose sinusoidal wave signal and cosine wave signal.

9. The power steering system as claimed in claim 8, wherein the steering mechanism includes a first pinion axle disposed on the output axle; a rack bar on which a first rack teeth section meshed with the first pinion axle and a second rack teeth section which is a rack axle different from the first rack teeth section are formed; a second pinion axle meshed with the second rack teeth section; a worm wheel disposed on the second pinion axle; and a worm shaft meshed with the worm wheel and on which a rotational force of the electrically driven motor is provided.

10. The power steering system as claimed in claim 9, wherein the first control unit is disposed at the steering shaft side and the second control unit is disposed at the electrically drive motor side and which is separated from the first control unit.

11. The power steering system as claimed in claim 9, wherein the abnormality detection purpose sinusoidal wave signal and cosine wave signal are stored in the second control unit and are transmitted to the first control unit.

12. The power steering system as claimed in claim 9, wherein the abnormality detection purpose sinusoidal wave signal and cosine wave signal are stored in the first control unit.

13. The power steering system as claimed in claim 12, wherein the second ECU outputs a calculation command signal to the first control unit to calculate the rotation angle on a basis of the abnormality detection purpose sinusoidal wave signal and cosine wave signal.

14. The power steering system as claimed in claim 8, wherein signals on the rotation angles which are the calculation results of the first control unit are divided via the first information communication circuit and are transmitted to the second control unit.

15. A control apparatus for a power steering system, the power steering system providing a steering assistance force for steerable wheels by an electrically driven motor along with a steering operation of a steering wheel, the control apparatus comprising:

a first control unit having a single core microcomputer in which a single processor core is mounted within a single processor package;

a steering angle signal receipt section installed in the first control unit to receive an output signal from a steering angle sensor, the steering angle sensor being constituted by magnetic reluctance elements and arranged to output sinusoidal wave signals and cosine wave signals which are rotation angle information of the steering shaft;

a torque signal receipt section installed in the first control unit to receive an output signal from a torque sensor, the torque sensor being constituted by resolvers and arranged to output other sinusoidal wave signals and cosine wave signals which are at least rotation angle information of the output axle to detect a torque generated on the steering shaft using a relative angle between the input axle and the output axle;

a first angle calculation process section installed in the first control unit to calculate rotation angles of the input axle and output axle on a basis of sinusoidal wave signals and cosine wave signals received from the steering angle signal receipt section and torque signal receipt section;

a second control unit having a multi-core microcomputer in which a plurality of processor cores are mounted within another single processor package;

first information communication circuit and second information communication circuit interposed between the first control unit and the second control unit, the first information communication circuit transmitting an information within the first control unit to the second control unit and the second information communication circuit transmitting an information within the second control unit to the first control unit;

a motor control circuit installed within the second control unit to drivingly control the electrically driven motor on a basis of rotation angles of the input axle and output axle which are calculation results of the first control unit transmitted via the first information communication circuit; and an abnormality detection process section installed in the second control unit to detect an abnormality of the first angle calculation process section of the first control unit, the abnormality detection process section detecting the abnormality of the first angle calculation process section by comparing the rotation angle calculated by the first angle calculation process section on a basis of abnormality detecting purpose sinusoidal wave signal and cosine wave signal which are different from the output signals of the steering angle sensor and the torque sensor with the rotation angle corresponding to the abnormality detection purpose sinusoidal wave signal and cosine wave signal calculated by the second control unit.

16. The control apparatus for the power steering system as claimed in claim 6, wherein the abnormality detection purpose sinusoidal wave signal and cosine wave signal are stored in the second control unit and are transmitted to the first control unit.

17. The control apparatus for the power steering system as claimed in claim 15, wherein the abnormality detection purpose sinusoidal wave signal and cosine wave signal are stored in the first control unit.

18. The control apparatus for the power steering system as claimed in claim 17, wherein the second control unit outputs a calculation command signal to the first control unit to calculate the rotation angle on a basis of the abnormality detection purpose sinusoidal wave signal and cosine wave signal.

19. The control apparatus for the power steering system as claimed in claim 15, wherein signals on the rotation angles which are the calculation results of the first control unit are divided via the first information communication circuit and are transmitted to the second control unit.

\* \* \* \* \*